US012609212B2

(12) United States Patent
Smith et al.

(10) Patent No.: US 12,609,212 B2
(45) Date of Patent: Apr. 21, 2026

(54) TRITIUM UPTAKE AND STORAGE VIA METAL-ORGANIC FRAMEWORKS (MOFS) FOR BETAVOLTAIC POWER SOURCES

(71) Applicant: Direct Kinetic Solutions Inc, El Paso, TX (US)

(72) Inventors: Brenda Ann Smith, Knoxville, TN (US); John A. Russo, Jr., Mount Airy, MD (US); William Ray, II, Lubbock, TX (US)

(73) Assignee: Direct Kinetic Solutions Inc., El Paso, TX (US)

( * ) Notice: Subject to any disclaimer, the term of this patent is extended or adjusted under 35 U.S.C. 154(b) by 204 days.

(21) Appl. No.: 18/384,841

(22) Filed: Oct. 28, 2023

(65) Prior Publication Data

US 2025/0140432 A1 May 1, 2025

(51) Int. Cl.
*G21H 1/00* (2006.01)
*G21H 1/06* (2006.01)

(52) U.S. Cl.
CPC .................................... *G21H 1/06* (2013.01)

(58) Field of Classification Search
CPC .. G21H 1/00; G21H 1/12; G21H 1/02; G21H 1/04
USPC .......................................................... 310/303
See application file for complete search history.

(56) References Cited

U.S. PATENT DOCUMENTS 3,235,463 A * 2/1966 Sankovich ............. G21C 13/04 376/400
5,859,484 A * 1/1999 Mannik .................... G21H 1/06 136/202
7,659,522 B2 * 2/2010 Kim ......................... H05H 7/00 376/195
7,799,120 B2 * 9/2010 Yaghi ..................... B01J 20/226 95/91

(Continued)

FOREIGN PATENT DOCUMENTS

TW 1652113 B * 3/2019 ........ B01J 20/28076

OTHER PUBLICATIONS

TW-1652113-B English Translation.*

(Continued)

*Primary Examiner* — Maged M Almawri
(74) *Attorney, Agent, or Firm* — Lloyd & Mousilli, PLLC; Feras Mousilli; Benjamin M. Hanrahan

(57) ABSTRACT

A method of making a radioisotopic power source, including receiving a predetermined amount of a plurality of Metal-Organic Framework (MOF) particles within a reactor vessel, degassing the received predetermined amount of the MOF. The degassing includes placing the predetermined amount of the MOF under vacuum conditions, heating the received predetermined amount of the MOF above a first predetermined temperature for a first predetermined time period, and sealing the heated MOF. The method also includes cooling the heated and sealed predetermined amount of the MOF to a second predetermined temperature, while maintaining a pressure of the reactor vessel to a first predetermined pres- (Continued)

sure value for a second predetermined time period, receiving a predetermined amount of a plurality of beta emitter particles at a gaseous state and mixing the predetermined amount of beta emitter particles with the cooled predetermined amount of the MOF.

12 Claims, 12 Drawing Sheets

(56) References Cited

U.S. PATENT DOCUMENTS

| | | | | |
|---|---|---|---|---|
| 8,017,412 | B2 | 9/2011 | Spencer et al. | |
| 8,487,507 | B1 * | 7/2013 | Cabauy | G21H 1/06 310/303 |
| 8,552,616 | B2 * | 10/2013 | Prelas | G21H 1/06 257/E21.12 |
| 9,539,559 | B2 | 1/2017 | Chen et al. | |
| 9,751,074 | B2 | 9/2017 | Kim et al. | |
| 10,163,537 | B2 * | 12/2018 | Hamilton | G21H 1/08 |
| 10,373,723 | B2 * | 8/2019 | Tompson, Jr. | G21H 1/12 |
| 10,580,544 | B2 * | 3/2020 | Fenner | A61N 1/378 |
| 11,318,409 | B2 | 5/2022 | Thallapally et al. | |
| 11,783,956 | B2 * | 10/2023 | Cabauy | H10F 30/29 310/303 |
| 12,050,291 | B2 * | 7/2024 | Jarrell | G01T 1/2023 |
| 2010/0143693 | A1 * | 6/2010 | Yaghi | B01D 53/02 428/305.5 |
| 2015/0310952 | A1 * | 10/2015 | Cabauy | G21H 1/06 310/303 |
| 2015/0369928 | A1 * | 12/2015 | Reese | G01T 1/2006 250/362 |
| 2018/0226165 | A1 * | 8/2018 | Ayers | G21H 1/12 |
| 2020/0312477 | A1 * | 10/2020 | Russo | H10F 77/45 |
| 2021/0328086 | A1 * | 10/2021 | Hubbard | H10F 77/45 |
| 2022/0350039 | A1 * | 11/2022 | Jarrell | H10F 30/29 |
| 2023/0091756 | A1 * | 3/2023 | Cabauy | G21H 1/06 310/303 |
| 2024/0280712 | A1 * | 8/2024 | Aspinwall | G01T 1/203 |

OTHER PUBLICATIONS

A Mini Review of Advances in Porous Materials Designing for Hydrogen Isotope Separation.*

Hunter B. Andrews, Monitoring Xenon Capture in a Metal Organic Framework Using Laser-Induced Breakdown Spectroscopy, Micromachines 2023, 14, 82, pp. 1-10, Retrieved from: https://doi.org/10.3390/mi14010082.

Lance Hubbard et al., Tritium Betavoltaic Powered Sensor Platforms: Power Augmentation with Scintillating Particles, Pacific Northwest National Laboratory, Report PNNL-32152, pp. 1-23, Sep. 2021, United States.

* cited by examiner

900

902 904

906 908

| INGREDIENT | PERCENT BY MOLE |
|---|---|
| A PLURALITY OF METAL ORGANIC FRAMEWORK (MOF) PARTICLES OF ONE OR MORE METAL ORGANIC FRAMEWORKS (MOFS) | 50% |
| AT LEAST ONE MOLECULE OF TRITIUM | 50% |

FIG. 9

TRITIUM UPTAKE AND STORAGE VIA METAL-ORGANIC FRAMEWORKS (MOFS) FOR BETAVOLTAIC POWER SOURCES

TECHNICAL FIELD

The present disclosure relates generally to the field of electrical energy power source storages, and particularly to a storage for a radioisotopic electrical energy power source, and a system and method of producing the storage.

BACKGROUND

There has been an increasing interest in and use of autonomous sensors in environmental monitoring for space and terrestrial applications where operations over multiple decades (>10-15 years) are essential. These sensors need to be compact and lightweight while, also, being able to operate in continuous sleep or dynamic mode. Since sensor power requirements have not reduced at the same rate as their physical size. There is a great need for compact sources that can power unattended sensors for more than a decade without creating much difficulty for logistics. These unattended sensors are in the harshest and most remote locations, which would be dangerous for personnel maintenance and power source replacement. Currently, a one cubic centimeter sensor and power source, at a constant power draw of one milliwatt, cannot maintain operation time greater than a year. Commercial chemical batteries such as lithium-ion batteries (LiBs), lithium primary batteries, PV cells, and fuel cells (FCs) are used as temporary solutions to this ongoing power in the unattended sensor field. However, they are the limiting component of the sensor because of low energy density, specific energy, and sensitivity to environmental conditions.

If all engineering and operational flaws of the current chemical sources were to be ignored, avoided, or supplemented, there is still a basic specific energy "chemical limit." The intrinsic specific energy of any type of material is based on the characteristic energy related to a basic building block. The building block for chemical sources is the atom and each electron within the volume, which is bound with 10-100 eV and binding energies of a few electron volts. Independent of the physical form, the specific energy "chemical limit" is constrained to about 5×10^4 J/g based on fundamental physics.

Radioactive isotopes or radioisotope-based power sources (RPSs) can address the energy density limitations of chemical-based sources. They, like nuclear reactors, generate direct current electrical energy from nuclear decay. They can provide a continuous amount of power over a significantly longer lifetime than chemical-based power sources, especially when compared to a single charge/discharge cycle. Radioisotopes have energy densities several orders of magnitude higher than chemical power sources.

Radioisotopes decay by three different particle emission types: gamma (i.e. electromagnetic radiation), beta (electron or positron), and alpha (atomic nucleus emission). Beta-emitting radioisotopes are the most appealing candidates for radioisotope power sources because they do the least amount of damage to the transducer (i.e. semiconductor converter) and the environment.

The most efficient solid-state energy conversion approach uses a voltaic cell. A voltaic cell is a semiconductor device, typically a PN or PIN junction diode. If a beta-emitting radioisotope is used, the semiconductor device is called a betavoltaic cell. If an alpha-emitting radioisotope is used, the semiconductor device is called an alphavoltaic cell. Following a two-dimensional perspective, the beta-emitting radioisotope source emits beta particles (high energy electrons), penetrating the semiconductor material. Electron-hole pairs (e-h-ps, ehps, or EHPs) are then generated in the surrounding semiconductor by the ionization trails of the beta particles. The use of low energy beta particles provides enhanced lifetimes, due to the absence of semiconductor degradations. The configuration can be compact, and can theoretically achieve the highest surface power density of all the energy conversion approaches relative to RPS.

Tritium (H-3) and nickel-63 (Ni-63) have relatively low beta energy emissions, are commercially available in the market, and are used in several radioisotope power sources. H-3 is the least expensive radioactive source and lowest toxicity with a low energy beta emitter and a half-life of 12.6 years.

The major setback with RPS based H-3 deals with its physical state at standard atmospheric temperature and pressure (SATP) and standard temperature and pressure (STP) being a gas. It is difficult to handle gasses when constructing small RPSs. Metal tritides have high specific activities and beta flux power, also called surface power density. Yet, their high mass density produces low beta emission depth and high beta self-absorption. Most metal tritides such as lithium tritide are pyrolytic with the exception of titanium tritide and zirconium tritide. Metal tritides are toxic. In addition, metal tritides display intrinsic leakage and delamination due to "helium bubble growth" based on the H-3 decay, which leads to potential environmental contamination and lower power output.

Carbon forms such as carbon nanotubes, hydrogenated graphene, and graphane are promising but currently, none have been successfully tritiated. In addition, because of early development and the difficulty of even hydrogenation, they are far being ready for tritiation development. Polymers and organic monomers have been tritiated before but still have setbacks such as yield, low effective energy densities, low specific activity, and are not radiation hardened because of weak binding energies. The United States Patent Application Publication No. 2018/0297947 describes tritiated nitroxides as being used in RPSs. However, the inventors have not successfully produced a tritiated nitroxide based RPS that is comparable to metal tritide based RPS.

Existing solutions use electroplated metal tritides (e.g. titanium (III) tritide) as a tritium source for tritium based radioisotope power sources. The specific activity of titanium tritide ($TiT_2$) is 1076 Ci/gram and its density equals 3.91 g/$cm^3$. $TiT_2$ is known as a material for tritium storage since tritium can be difficult to control. Further, $TiT_2$ is not stable at room temperature and within a week approximately 19% of tritium is lost, and even more over time. Thus, the foils can only be loaded up to a maximum of 83% with tritium ($TiT_{1.66}$). When implementing this material into a power source product, the side coated with the $TiT_2$ is in contact with the semiconductor material. With this type of interaction, a direct conversion from beta to electrical energy takes place.

The interaction between the radioisotope and semiconductor can be enhanced by integrating the radioisotope more efficiently. By directly depositing the radioisotope onto and within the semiconductor surface and/or structural morphology, the energy conversion can be enhanced significantly, and thus the power output improves. Tritium is a weak beta emitter and therefore its energy pathway to the semiconductor is short, in comparison to a gamma emitter, or else self attenuation will occur and/or become predominant. A low material density can improve the efficiency in delivering the beta-emitting energy to the semiconductor.

In view of the above discussion, there is a need for a system and method for producing a material and the material for facilitating generating of electrical energy betavoltaically that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein includes a system for producing a material for facilitating generating of electrical energy betavoltaically. The system includes a reaction vessel configured for receiving an amount of a Metal Organic Framework (MOF) material in the reaction vessel, The MOF material includes a plurality of MOF particles of one or more MOF. The system also includes a temperature controller coupled with the reaction vessel, wherein the temperature controller is configured for modifying a value of a temperature associated with the MOF material to one or more required values of the temperature after the receiving, a manifold coupled with the reaction vessel, wherein the manifold comprises an inlet channel and an outlet channel. A first end of the inlet channel is fluidly coupled with the reaction vessel using a first vessel valve, wherein a first end of the outlet channel is fluidly coupled with the reaction vessel using a second vessel valve. The system also includes a first tank fluidly coupled with a second end of the inlet channel, wherein the first tank comprises a tritium gas. The first tank is configured for supplying the tritium gas through the inlet channel to the reaction vessel for at least one duration based on a transitioning a first tank valve of the first tank to an open state, a transitioning the first vessel valve to an open state, and a transitioning of the second vessel valve to a closed state. The system also includes a pressure controller coupled with the inlet channel of the manifold. The pressure controller is configured for modifying a value of a pressure associated with the reaction vessel to one or more required values of the pressure for allowing absorption of at least one amount of the tritium gas into the amount of the MOF material for the producing of the material. Also, the material is a MOF-tritium material. Further, the MOF-tritium material includes at least one molecule of tritium stored in at least one pore formed by the plurality of MOF particles.

Certain embodiments disclosed herein also include a method of making a radioisotopic power source, including receiving a predetermined amount of a plurality of Metal-Organic Framework (MOF) particles within a reactor vessel, degassing the received predetermined amount of the MOF. The degassing includes placing the predetermined amount of the MOF under vacuum conditions, heating the received predetermined amount of the MOF above a first predetermined temperature for a first predetermined time period, and sealing the heated MOF. The method also includes cooling the heated and sealed predetermined amount of the MOF to a second predetermined temperature, while maintaining a pressure of the reactor vessel to a first predetermined pressure value for a second predetermined time period, receiving a predetermined amount of a plurality of beta emitter particles at a gasous state and mixing the predetermined amount of beta emitter particles with the cooled predetermined amount of the MOF within the reactor vessel so that a weight ratio between the received predetermined amount of a plurality of beta emitter particles and the predetermined amount of the plurality of MOF particles is 1:1 is maintained, modifying the pressure of the reactor vessel to a second predetermined pressure, and evacuating the reactor vessel and flushing the vessel with an inert gas to remove residual gaseous beta emitter particles.

Certain embodiments disclosed herein also include A radioisotopic power source, including a plurality of Metal-Organic Framework (MOF) particles, the plurality of MOF particles each having at least one pore, and at least one beta emitter particle stored in the at least one pore.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 9 is a table 900 listing ingredients of a material for facilitating generating of electrical energy betavoltaically according to an embodiment.

DETAILED DESCRIPTION

Figure 1:
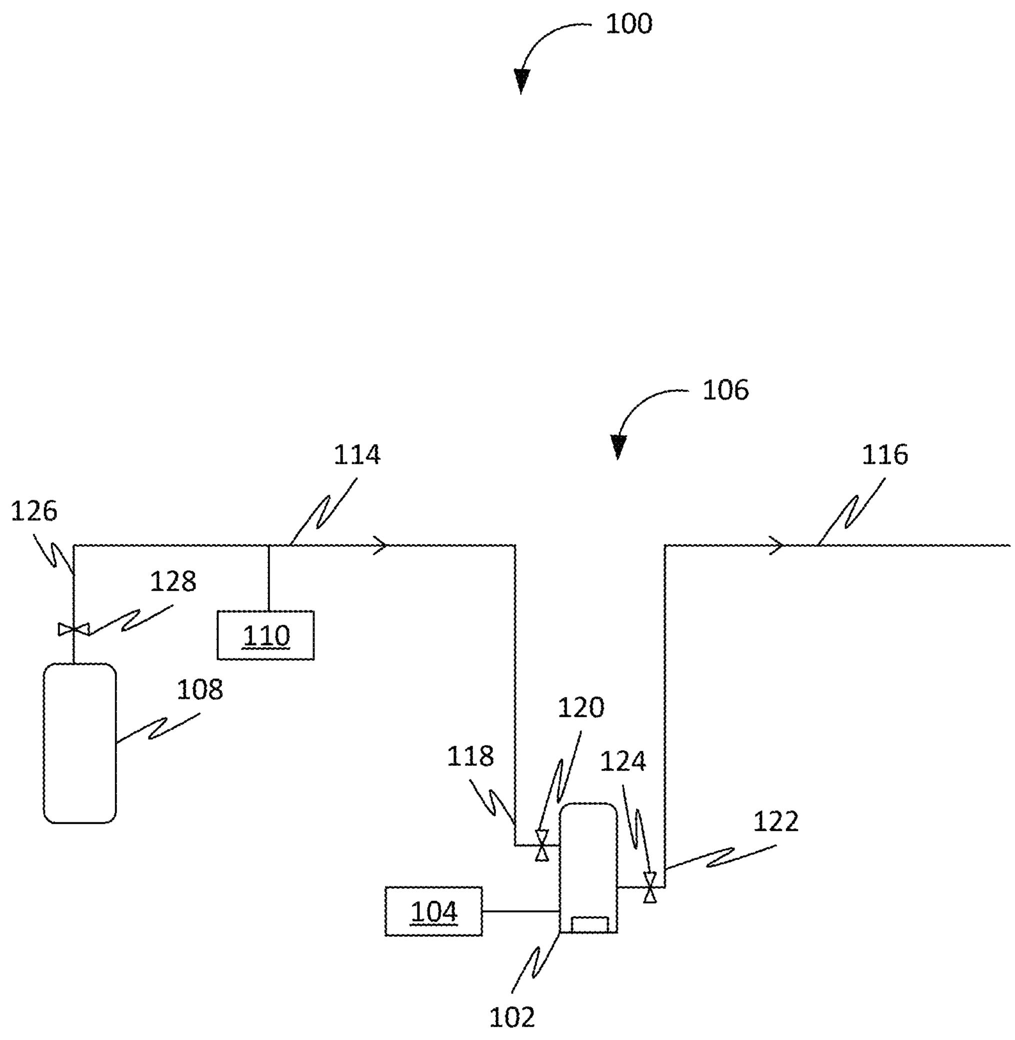
FIG. 1 is an example schematic diagram of a system 100 for producing a material for facilitating generating of electrical energy betavoltaically according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for producing a material and the material for facilitating generating of electrical energy betavoltaically.

Further, the present disclosure describes tritium update/storage via metal-organic frameworks (MOFs) for betavoltaic power sources. Further, the physical properties of the MOFs are used to uptake the tritium gas which is extremely mobile and radioactive. Further, the MOFs are highly porous compounds where the pores may be used to store small molecules such as low-molecular weight gasses (Tritium gas). The MOF provides essentially a housing for the tritium gas by localizing/containing the tritium gas. The tritium-loaded MOF becomes a manageable in handling tritium for many applications.

Further, the present disclosure describes a material comprising tritium and a metal-organic framework with high physisorption selectivity towards tritium gas. Further, the material may be used as a low power source by conjunction of the material with a semiconductor and a power board.

Further, the present disclosure describes a method capturing and/or storing tritium gas via physisorption using metal organic frameworks (MOFs) at near SATP with high gravimetric capacity, amount of tritium that can be stored per unit of mass, and volumetric capacity, the fraction of void space (includes pore volume and surface) occupied by tritium. Further, the MOFs may include metals as the core of the MOFs. Further, the metals may include transition (i.e. $Cu^{3+}$, $Ir^{3+}$, $Ni^{3+}$, $Zn^{2+}$) and main group (i.e. $Li^{+}$, $Na^{+}$, $Mg^{2+}$) metals. Further, the MOFs form pores and a size of the pores is close to the kinetic diameter of tritium ($T_2$) gas to maximize the gravimetric capacity. Further, the other physical properties of the material may enhance the gravimetric capacity. Further, the MOFs include organic ligands and/or linkers coordinated to the metal and/or metal cluster. The organic ligands and/or linkers may include but are not limited to, organosulfonates, carboxylates, phosphonates, and/or N-donor ligand groups which could lead to cross-linking and/or more dimensional structures (e.g. one-dimensional vs two-dimensional) with tailored designed architectures.

Further, the MOFs may be derived using one or more synthesis methods. Further, the one or more synthesis methods may include but are not limited to sol-gel method, solid-state method, wet-chemical method, microwave-assisted method, aerogel method, acid-digestion method, hydrothermal method, and solvothermal method. Further, the metals of the MOFs may include a light metal such as $Li^{+}$. Further, the metal such as $Li^{+}$ may increase the gravimetric capacity of the MOFs.

Further, the present disclosure describes a method for producing MOF-tritium material for producing electrical energy betavoltaically. Further, the method may include the following steps:

Step 1. Calculating the amount of tritium needed at 100 wt % based on a fixed MOF amount. For example, to load 100 grams of the MOF, 100 grams of tritium ($T_2$) is needed.

Step 2. Loading the calculated MOF amount from MOF into a reactor vessel (reaction vessel).

Step 3. Degassing and removing any solvent residue of the MOF by placing a manifold connected to the reaction vessel under vacuum (e.g. 10e−5 torr) and applying a regulated/calibrated heat tape around the reactor vessel above 200° C. Further, step 3 may be at least a 2-hour long process or even an overnight process. After completion of step 3, close the front and back end valves on the manifold to ensure no external gas and/or moisture is introduced into the manifold.

Step 4. Removing the heat tape if needed depending on the target temperature.

Step 5. Chilling or heating the reactor vessel based on the target temperature. A heating tape can be used for heating the reactor vessel. For cooling the reactor vessel dry ice bath with ethanol (−78° C.), liquid nitrogen (−210° C.), or liquid helium (−269° C.) can be used. The reactor vessel is to be kept at this temperature for at least one hour to ensure the MOF temperature is in alignment with the reactor's casing temperature.

Step 6. With the tritium gas tank attached to the manifold, opening the tritium gas tank main valve. Based on the 100 wt % tritium, regulating the mass flow controller to the target tritium mass.

Step 7. Adjusting the pressure of the reactor using the pressure controller.

Step 8. Evacuating the manifold and capturing the tritium in an empty gas cylinder.

Step 9. Flushing the manifold with argon for a few minutes once the pressure controller reads at atmospheric pressure to remove any residue tritium in the manifold.

Step 10. Removing the reactor vessel from the manifold.

Step 11. Removing the MOF-tritium material.

Step 12. Measuring the amount of uptake of tritium by using a thermal gas absorption instrument.

Step 13. Repeating the above steps using a different set of temperature and pressure parameters to optimize the maximum tritium uptake per MOF compound.

Further, the present disclosure describes a method for producing electrical energy/power sources using semiconductor bodies, with the use of radioisotope compounds captured in Metal organic framework (MOF). Further, the radioisotope compound is Tritium (H3) gas. Further, the Tritium gas is stored in Metal organic framework. Further, the Tritium gas is stored or captured in the pores of Metal organic framework via the phenomenon at near SATP with high gravimetric capacity and volumetric capacity. Further, the Metal organic framework may be synthesized using organic ligands and/or linkers coordinated to the metal and/or metal cluster. Further, the synthesis method to derive these MOFs may include but is not limited to, sol-gel, solid-state, wet-chemical, microwave-assisted, aerogel, acid-digestion, hydrothermal, and solvothermal. Further, organic ligands and/or linkers of the MOF may feature but are not limited to organosulfonates, carboxylates, phosphonates, and/or N-donor ligand groups which could lead to cross-linking and/or more dimensional structures (e.g. one-dimensional vs two-dimensional) with tailored designed architectures. Further, the MOF may include includes metal ions but is not limited to transition (i.e. Cu3+, Ir3+, Ni3+, Zn2+) and main group (i.e. Li+, Na+, Mg2+) metals as the core. Further, a material made of the MOF may be used as part/component of a larger product and/or integrated into another product such as a unit requiring low-power. Further, the material made of the MOF may serve as a power source in powering a unit. An example of the unit may be a microphone, a temperature sensor, a proximity sensor, etc.

FIG. 1 is an example schematic diagram of a system 100 for producing a material for facilitating generating of electrical energy betavoltaically according to an embodiment. The system 100 may include a reaction vessel 102, a temperature controller 104, a manifold 106, a first tank 108, and a pressure controller 110.

The reaction vessel 102 may be configured for receiving an amount of a metal organic framework (MOF) material in the reaction vessel 102. The MOF material may include a plurality of metal organic framework (MOF) particles of one or more metal organic frameworks (MOFs). Also, the reaction vessel 102 may be a container. Further, the plurality of metal organic framework (MOF) particles have a formula of $[M_xO(BDC)_3]$, $[M_xO(BBC)_4]$, etc. Also, M may be metals. Additionally, BDC may be 1,4 benzenedicarboxylate. Further, BBC may be BBC=4,4',4"-(Benzene-1,3,5-triyl-tris (benzene-4,1-diyl))tribenzoic acid.

The temperature controller 104 may be coupled with the reaction vessel 102. Also, the temperature controller 104 may be configured for modifying a value of a temperature associated with the MOF material to one or more required values of the temperature after the receiving. Further, the temperature controller 104 may be an electronically controlled heating and cooling element.

The manifold 106 may be coupled with the reaction vessel 102. Also, the manifold 106 may include an inlet channel 114 and an outlet channel 116. Further, a first end 118 of the inlet channel 114 may be fluidly coupled with the reaction vessel 102 using a first vessel valve 120. Also, a first end 122 of the outlet channel 116 may be fluidly coupled with the reaction vessel 102 using a second vessel valve 124.

The first tank 108 may be fluidly coupled with a second end 126 of the inlet channel 114. Also, the first tank 108 may include a tritium gas. Further, the first tank 108 may be configured for supplying the tritium gas through the inlet channel 114 to the reaction vessel 102 for at least one duration based on a transitioning a first tank valve 128 of the first tank 108 to an open state, a transitioning the first vessel valve 120 to an open state, and a transitioning of the second vessel valve 124 to a closed state.

The pressure controller 110 may be coupled with the inlet channel 114 of the manifold 106. Also, the pressure controller 110 may be configured for modifying a value of a pressure associated with the reaction vessel 102 to one or more required values of the pressure for allowing absorption of at least one amount of the tritium gas into the amount of the MOF material for the producing of the material. Further, the absorption may include physisorption. Also, the material may be a metal organic framework (MOF)-tritium material. Further, the material may include at least one molecule of tritium stored in at least one pore formed by the plurality of metal organic framework (MOF) particles. Also, the pressure controller 110 may be an electrically controlled pressure relief valve.

Figure 2:
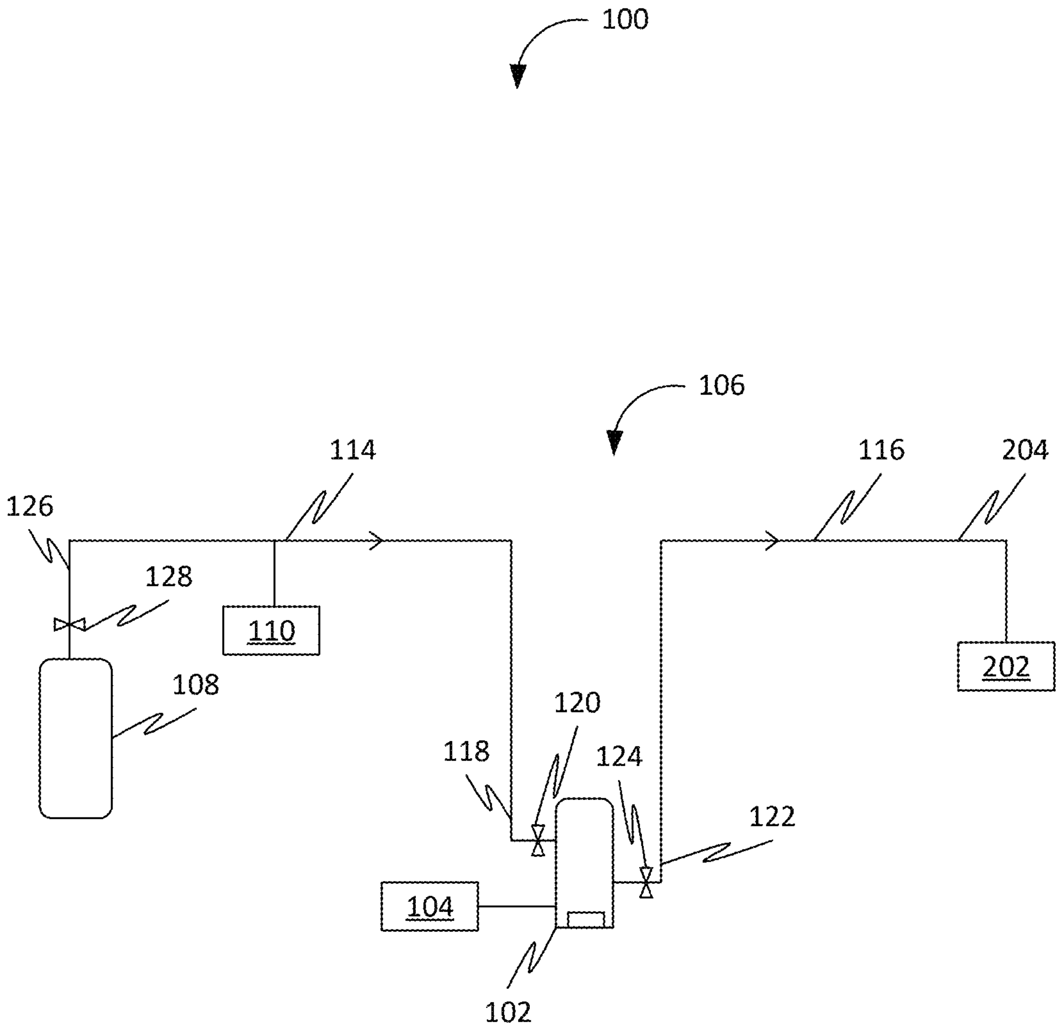
FIG. 2 is an example schematic diagram of the system 100 according to an embodiment.

In further embodiments, the system 100 may include a vacuum pump 202, as shown in FIG. 2, fluidly coupled with a second end 204 of the outlet channel 116. The vacuum pump 202 may be configured for applying a vacuum to the manifold 106 based on a transitioning of the first vessel valve 120 to the open state and a transitioning of the second vessel valve 124 to an open state after the receiving of the MOF material. Also, the applying of the vacuum removes a solvent residue of the MOF material from the manifold 106 after the receiving of the MOF material. Further, the supplying of the tritium gas may be based on the applying of the vacuum. Also, the applying of the vacuum may include applying 10e-5 torr of the vacuum.

Figure 3:
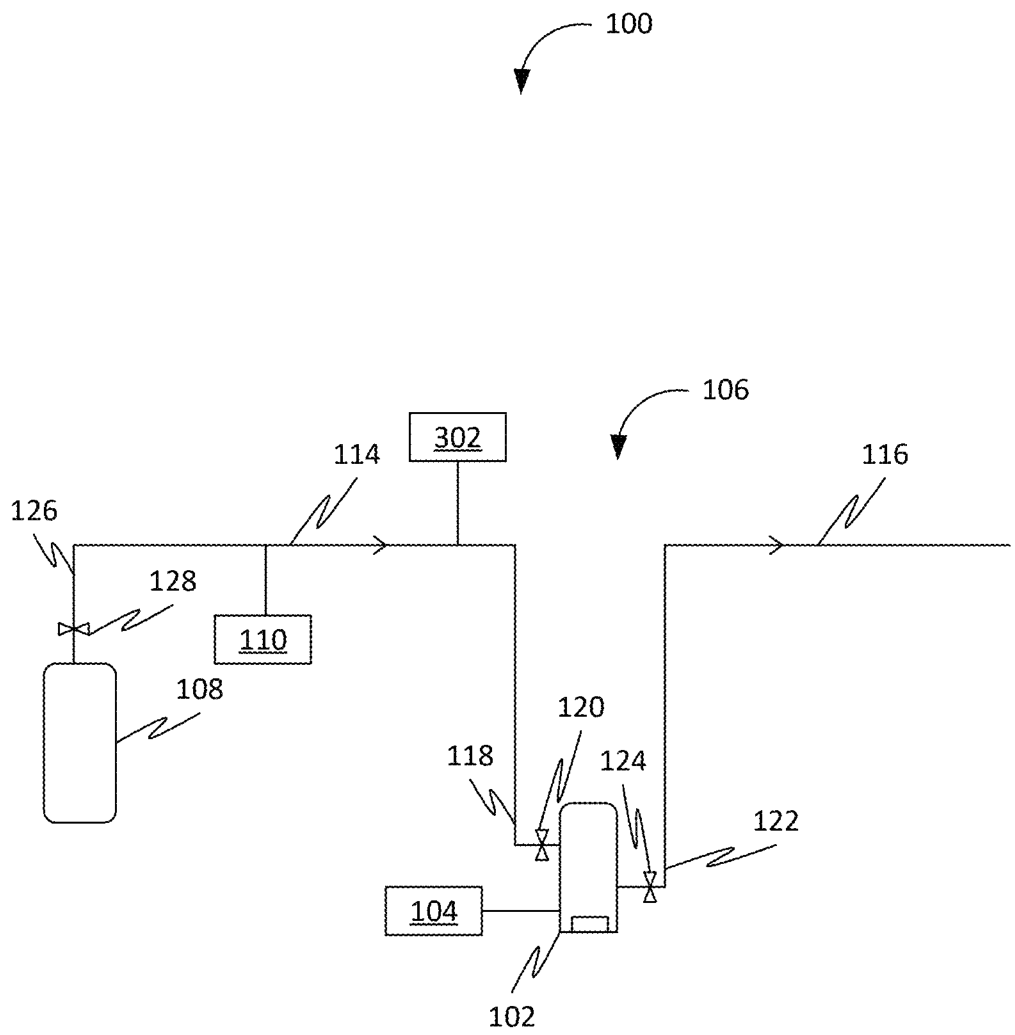
FIG. 3 is an example schematic diagram of the system 100 according to an embodiment.

In further embodiments, the system 100 may include a mass flow controller 302, as shown in FIG. 3, coupled with the inlet channel 114. The mass flow controller 302 may be configured for modifying a value of a mass flow rate of the tritium gas to one or more required values of the mass flow rate after the supplying of the tritium gas. Also, the absorption of the at least one amount of the tritium gas into the amount of the MOF material may be based on the modifying of the value of the mass flow rate of the tritium gas to the one or more required values of the mass flow rate. Further, the mass flow controller 302 may electrically actuated valve. Also, the modifying of the value of the mass flow rate modifies the value of the pressure.

Figure 4:
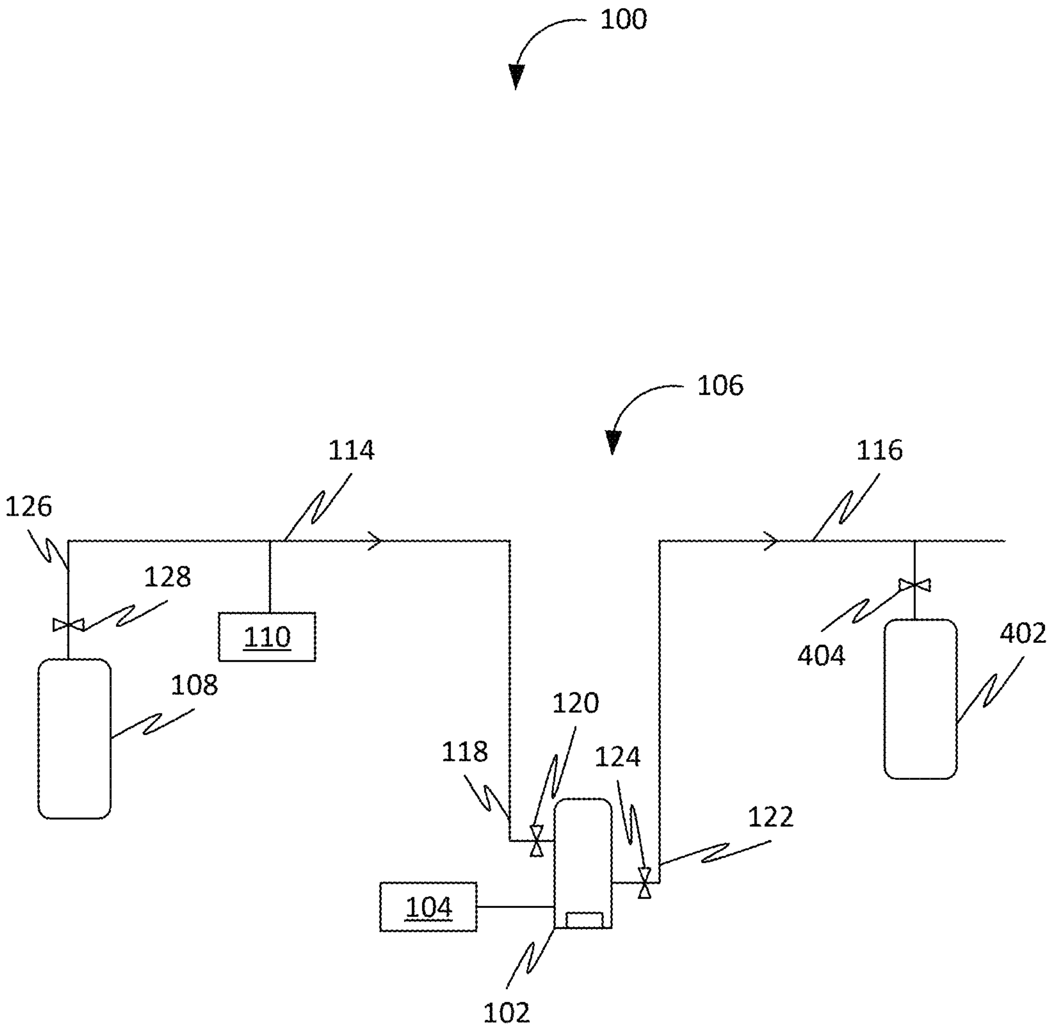
FIG. 4 is an example schematic diagram of the system 100 according to an embodiment.

In further embodiments, the system 100 may include a second tank 402, as shown in FIG. 4, fluidly coupled with the outlet channel 116. The second tank 402 may be configured for collecting at least one residue amount of the tritium gas from the reaction vessel 102 and the manifold 106 for evacuating the manifold 106 and the reaction vessel 102 based on a transitioning of a second tank valve 404, as shown in FIG. 4, of the second tank 402 to an open state, a transitioning of the first tank valve 128 to the closed state, and a transitioning of the second vessel valve 124 to the open state after the supplying of the tritium gas. The second tank 402 may be empty.

Figure 5:
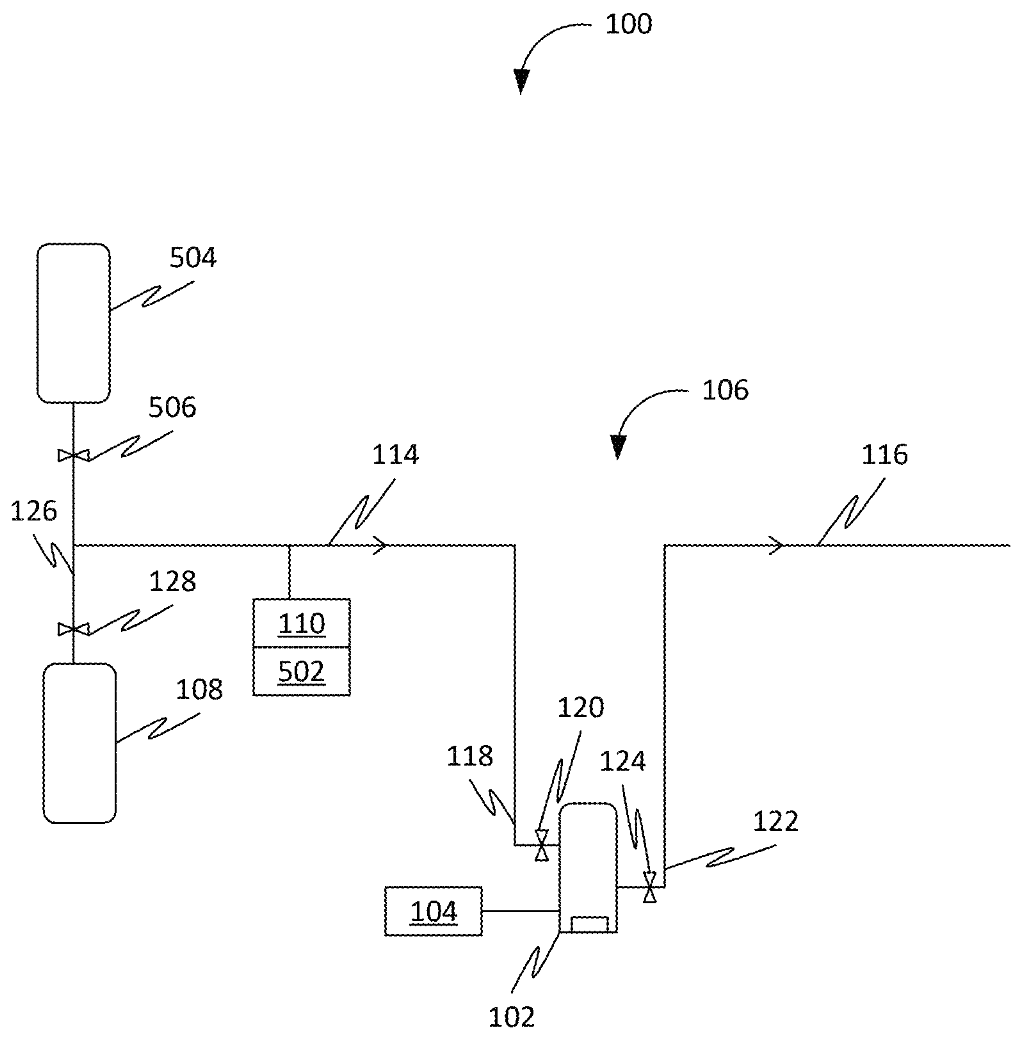
FIG. 5 is an example schematic diagram of the system 100 according to an embodiment.

Further, in some embodiments, the pressure controller 110 may include a pressure sensor 502, as shown in FIG. 5, configured for detecting a value of the pressure associated with the reaction vessel 102. Also, the system 100 may include a third tank 504, as shown in FIG. 5, fluidly coupled with the inlet channel 114. Further, the third tank 504 may include an inert gas. Further, the third tank 504 may be configured for supplying the inert gas through the inlet channel 114 to the reaction vessel 102 for at least one duration based on a transitioning a third tank valve 506, as shown in FIG. 5, of the third tank 504 to an open state, a transitioning of the first vessel valve 120 to the open state, a transitioning of the second vessel valve 124 to the open state, and a transitioning of the second tank valve 404 to a closed state after the detecting an atmospheric pressure value for the pressure. Also, the inert gas may be argon gas.

Figure 6:
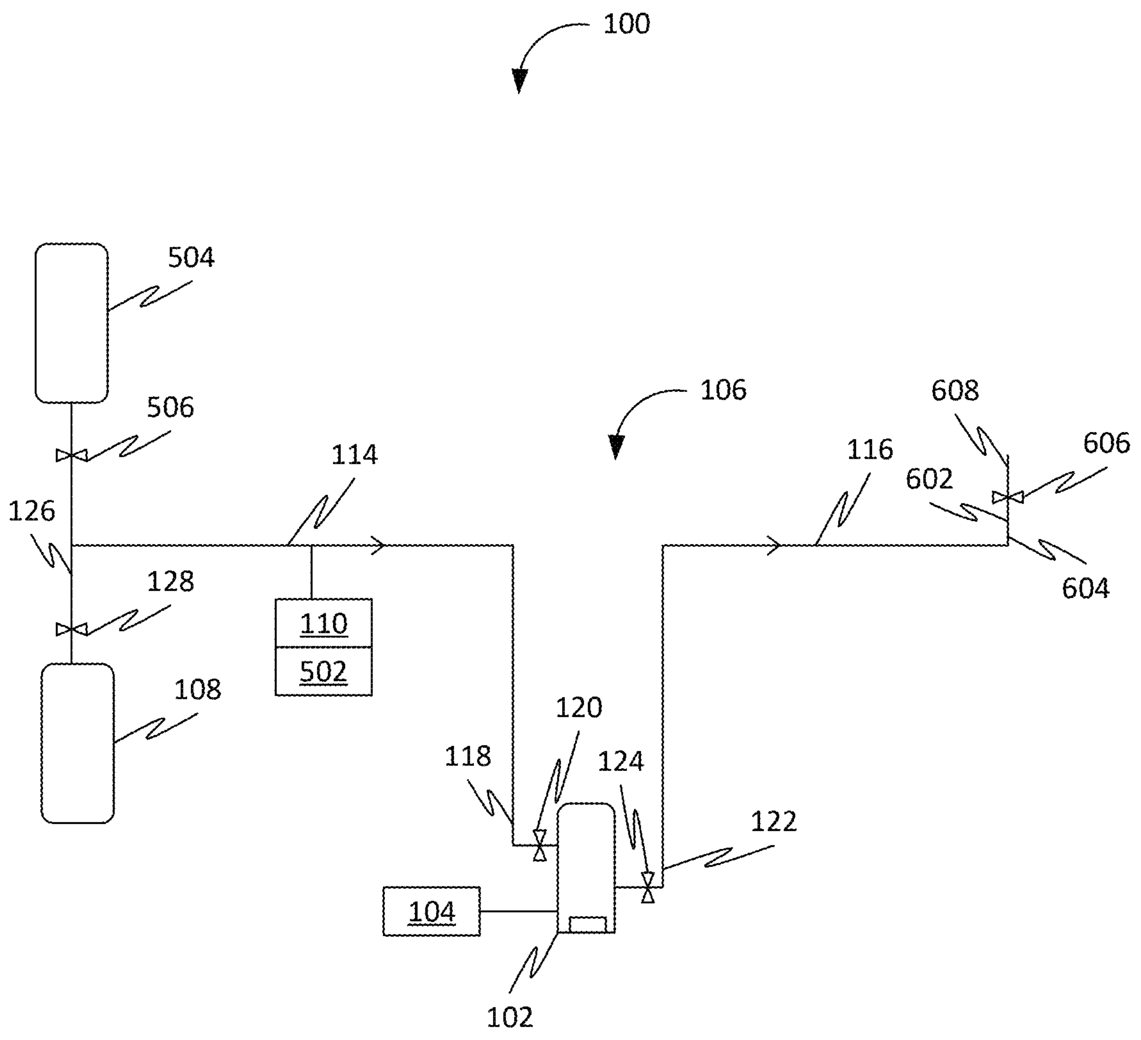
FIG. 6 is an example schematic diagram of the system 100 according to an embodiment.

The manifold 106 may include a secondary outlet channel 602, as shown in FIG. 6. Also, a first end 604 of the secondary outlet channel 602 may be fluidly coupled to the outlet channel 116 using a channel valve 606, as shown in FIG. 6. Further, the inert gas may be evacuated from a second end 608 of the secondary outlet channel 602 for flushing the manifold 106 and the reaction vessel 102 based on a transitioning of the channel valve 606 to an open state. Also, the flushing removes at least one residue amount of the tritium gas from the manifold 106 and the reaction vessel 102. Further, the metal organic framework (MOF)-tritium material may be retrievable from the reaction vessel 102 after the flushing.

Figure 7:
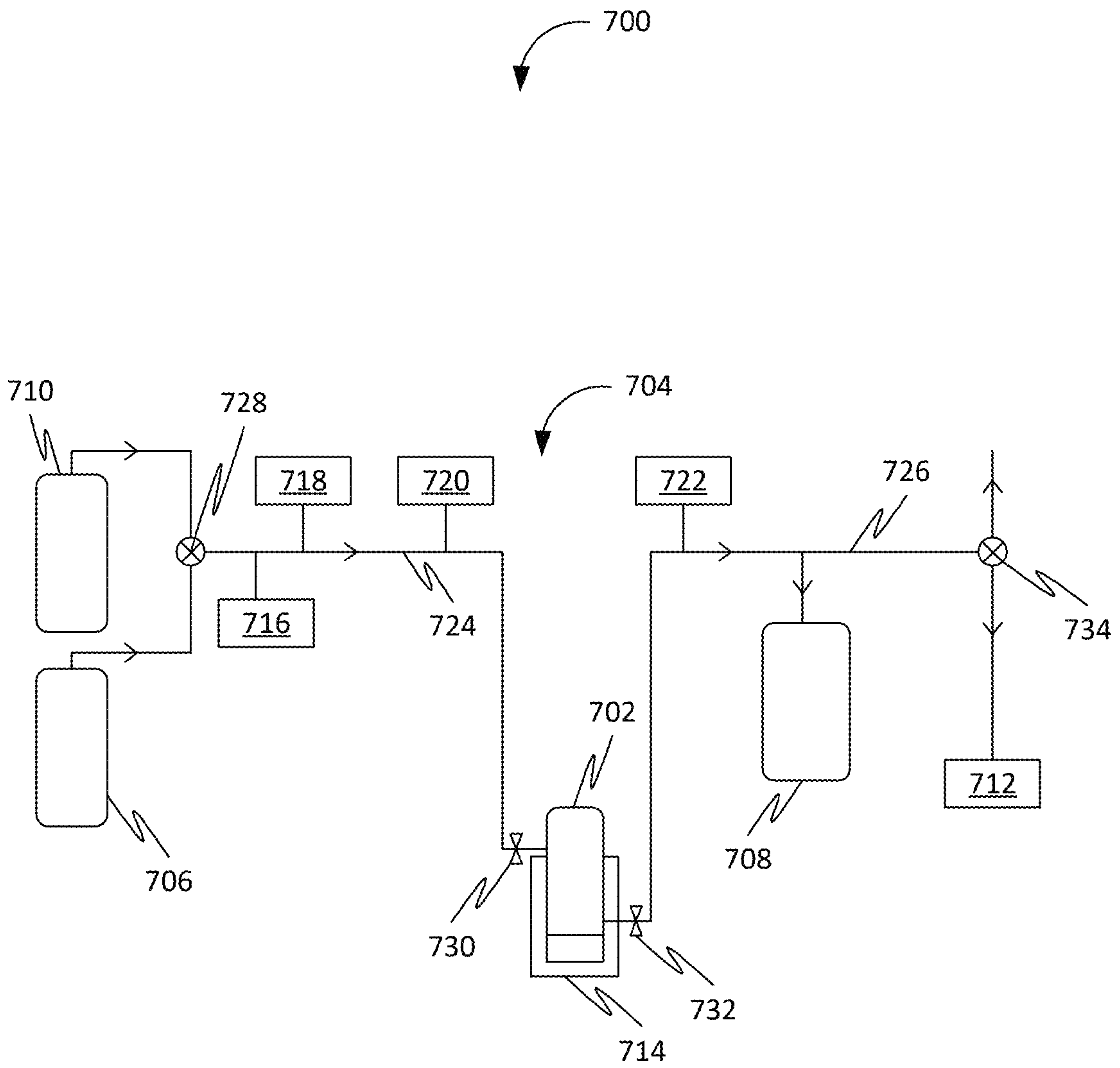
FIG. 7 is an example schematic diagram of a system 700 for producing a material for facilitating generating of electrical energy betavoltaically according to an embodiment.

FIG. 7 is an example schematic diagram of a system 700 for producing a material for facilitating generating of electrical energy betavoltaically according to an embodiment. The system 700 may include a reaction vessel 702, a manifold 704, a first tank 706, a second tank 708, a third tank 710, a vacuum pump 712, a controller 714, a pressure relief valve 716, a pressure gauge 718, a first mass controller 720, and a second mass controller 722.

The first tank 706 may include tritium gas, the second tank 708 may be empty, and the third tank 710 may include argon gas. Also, the manifold 704 may include an inlet channel 724 and an outlet channel 726. Further, the first tank 706 and the third tank 710 may be fluidly coupled to a first end of the inlet channel 724 using a three-way valve 728. Also, the pressure relief valve 716, the pressure gauge 718, and the first mass controller 720 may be coupled with the inlet channel 724. Further, the inlet channel 724 may be fluidly coupled to the reaction vessel 702 at a second end of the inlet channel 724 using a first valve 730. Also, the second tank 708 may be fluidly coupled with the outlet channel 726. Further, the second mass controller 722 may be coupled to the outlet channel 726. Also, the outlet channel 726 may be coupled to the reaction vessel 702 at a first end of the outlet channel 726 using a second valve 732. Further, the vacuum pump 712 may be fluidly coupled with the outlet channel 726 at a seocnd end of the outlet channel 726 using a three-way valve 734. Also, the controller 714 may include a pressure controller and a temperature controller.

Figure 8:
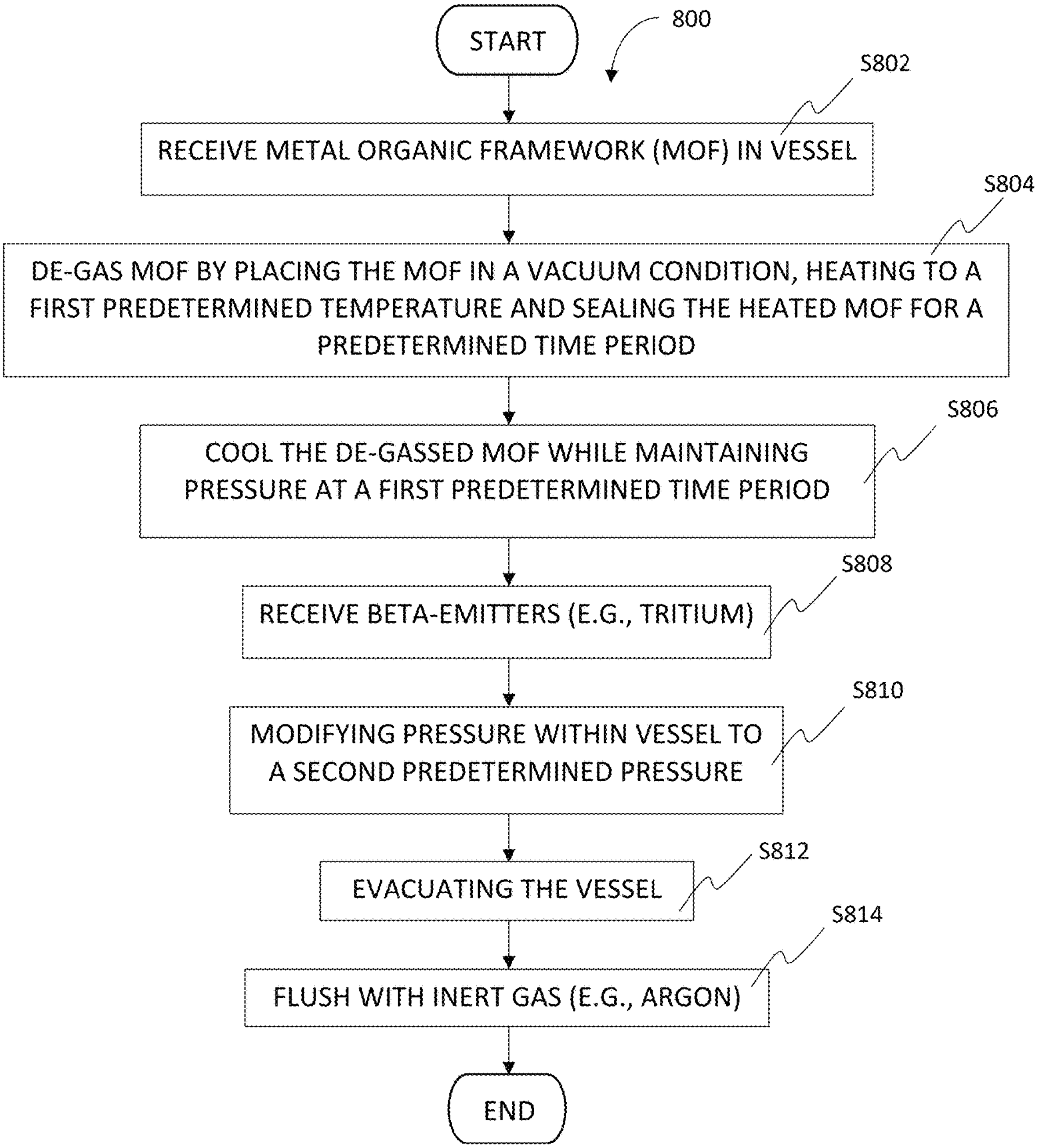
FIG. 8 is an example flowchart of a method 800 for producing a material for facilitating generating of electrical energy betavoltaically according to an embodiment.

FIG. 8 is an example flowchart of a method 800 for producing a material for facilitating generating of electrical energy betavoltaically according to an embodiment. At S802, an amount of a Metal Organic Framework (MOF) material is received in a reaction vessel. The MOF material may include a plurality of MOF particles of one or more MOF(s). Here, the received MOF is also degassed, and solvent residue of the MOF is removed by placing the received manifold under vacuum conditions (e.g., 10e-5 torr).

Next, at S804 degassing of the MOF is performed by modifying a value of a temperature associated with the received MOF material using a temperature controller to one or more predetermined values of the temperature. For example, the received predetermined amount of the MOF may be heated based on the signals issued by the temperature controller, or the application of a regulated/calibrated heat tape around a reactor vessel containing the received MOF above a first predetermined temperature of about 200 C for a first predetermined time period of between two to eight hours (e.g., overnight). Afterwards, the heated MOF is sealed to make sure no external gas and/or moisture is re-introduced.

Thereafter, at S806, the MOF is either heated or cooled to a second predetermined temperature, either via a new application of a heat tape or subjecting the MOF to a dry ice bath using ethanol (−78 C), liquid nitrogen (−210 C), or liquid helium (−269 C), for at least an hour, until the MOF temperature aligns with the reactor vessel's temperature. Simultaneously, the pressure applied to the MOF is maintained at a predetermined pressure value between 12000 torr to about 75000 torr.

The following Table is are examples of varying temperature and pressure ranges, along with the resulting weight percent absortion of tritium, to be discussed in more detail below.

TABLE 1

Temperature and Pressure Parameters (Examples)

| Total Absorbed (wt %) | Temperature (° C.) | Pressure (torr/bar) |
|---|---|---|
| 1-3 | 25 | 75000/100 |
| 4 | −196 | 12000/16 |
| 5 | −196 | 45000/60 |
| 7 | −196 | 75000/100 |

In an embodiment, based on the table above, the dwell time to hold the temperature and pressure may be for one to two hours at 75000 torr/100 bar and at 298K (near room temperature for tritium uptake to take place.

Next, at S808, a plurality of beta-emitters, such as tritium gas, is supplied using through an inlet channel of a manifold to the reaction vessel for at least one duration based on a transitioning a first tank valve of the first tank to an open state, a transitioning a first vessel valve associated with the reaction vessel to an open state, and a transitioning of a second vessel valve associated with the reaction vessel to a closed state. The manifold may include an inlet channel and an outlet channel. Also, a first end of the inlet channel may be fluidly coupled with the reaction vessel using the first vessel valve. Further, a first end of the outlet channel may be fluidly coupled with the reaction vessel using the second vessel valve.

Further, the method 800 may include a step S810 of modifying, using a pressure controller, a value of a pressure associated with the reaction vessel to one or more required values of the pressure for allowing absorption of at least one amount of the tritium gas into the amount of the MOF material for the producing of the material. Further, the material may be a metal organic framework (MOF)-tritium material. Further, the material may include at least one molecule of tritium stored in at least one pore formed by the plurality of metal organic framework (MOF) particles.

Tritium uptake may be maximized by identifying an MOF that has high selectivity for the target molecule/compound, along with optimized pressure and temperature conditions. For example, referring to Table 1, with a low temperature (−196 C) and high pressure (75000 torr/100 bar), one may achieve a 7% tritium uptake, while at room temperature and at the same high pressure, a 3% tritium uptake is achieved.

Next, at S812, evacuation may be performed using a vacuum pump, on the manifold based on a transitioning of the first vessel valve to the open state and a transitioning of the second vessel valve to an open state after the receiving of the MOF material. Evacuation removes a solvent residue of the MOF material from the manifold after the receiving of the MOF material. Also, the supplying of the tritium gas may be based on the applying of the vacuum.

In further embodiments, using a mass flow controller, a value of a mass flow rate of the tritium gas may be modified to one or more required values of the mass flow rate after the supplying of the tritium gas. Further, the absorption of the at least one amount of the tritium gas into the amount of the MOF material may be based on the modifying of the value of the mass flow rate of the tritium gas to the one or more required values of the mass flow rate. Further, the modifying of the value of the mass flow rate modifies the value of the pressure.

In further embodiments, using a second tank, at least one residue amount of the tritium gas may be collected from the reaction vessel and the manifold for evacuating the manifold and the reaction vessel based on a transitioning of a second tank valve of the second tank to an open state, a transitioning of the first tank valve to the closed state, and a transitioning of the second vessel valve to the open state after the supplying of the tritium gas.

In further embodiments, using a pressure sensor of the pressure controller, a pressure associated with the reaction vessel may be detected.

Once evacuation is performed and the pressure reaches atmospheric pressure, at S814 an inert gas such as argon is flushed through the inlet channel to the reaction vessel for at least one duration based on a transitioning a third tank valve of the third tank to an open state, a transitioning of the first vessel valve to the open state, a transitioning of the second vessel valve to the open state, and a transitioning of the second tank valve to a closed state after the detecting an atmospheric pressure value for the pressure.

In an embodiment, the manifold may include a secondary outlet channel. Also, a first end of the secondary outlet channel may be fluidly coupled to the outlet channel using a channel valve. Further, the inert gas may be evacuated from a second end of the secondary outlet channel for flushing the manifold and the reaction vessel based on a transitioning of the channel valve to an open state. Also, the flushing removes a residue amount of the tritium gas from the manifold and the reaction vessel. Further, the metal organic framework (MOF)-tritium material may be retrievable from the reaction vessel after the flushing. Thereafter, at S816, the amount of uptake of the tritium may be measured using a thermal gas absorption instrument.

It is noted that the steps above may be repeated using a different set of temperature and pressure parameters to maximize the tritium uptake per MOF compound.

FIG. 9 is a table 900 listing ingredients of a material for facilitating generating of electrical energy betavoltaically according to an embodiment. The table 900 may include two columns 902-904 and two rows 906-908. Also, the table 900 may include four cells (column 902, row 906), (column 904, row 906), (column 902, row 908), and (column 904, row 908).

As discussed previously, the material may include a plurality of MOF particles of one or more MOF(s) and at least one molecule of tritium.

The cell (column 902, row 906) may be related to the plurality of MOF particles of the one or more MOF(s). Also, the plurality of MOF particles forms at least one pore. Further, the cell (column 904, row 906) shows that the material may include the plurality of MOF particles of the one or more MOF(s) in an amount of at least 50% by mole based on the total mole of the material.

Additionally, the cell (column 902, row 906) may be related to the at least one molecule of tritium stored in the at least one pore. Also, a diameter of the at least one molecule of tritium may be substantially equivalent to a diameter of the at least one pore. Further, the cell (column 904, row 908) shows that the material may include the at least one molecule of tritium in an amount of at least 50% by mole based on the total mole of the material.

Also, in some embodiments, the plurality of MOF particles may be characterized by a degree of a physisorption selectivity towards the gas of the tritium.

Further, in some embodiments, at least one of the plurality of MOF particles may be comprised of one or more metal ion particles of one or more metal ions from at least one of a transition metal group and a main metal group. Here, the one or more metal ions form cores for the one or more MOFs.

Also, in an embodiment, the one or more metal ions from the transitional metal group may include at least one of $Cu^{3+}$, $Ir^{3+}$, $Ni^{3+}$, and $Zn^{3+}$. Further, the one or more metal ions from the main metal group may include at least one of $Li^{+}$, $Na^{+}$, and $Mg^{2+}$.

Additionally, in some embodiments, the plurality of MOF particles may be further include at least one of one or more organic ligand particles of one or more organic ligands one or more linkers particles of one or more linkers coordinated to the one or more metal particles for the forming of the at least one pore.

Also, in an embodiment, at least one of the one or more ligands and the one or more linkers may include at least one of organosulfonates, carboxylates, phosphonates, and N-donor ligand groups.

Further, in some embodiments, the plurality of MOF particles of the one or more MOF(s) may be synthesized using one or more synthesizing methods. Also, the diameter of the at least one pore formed by the plurality of MOF particles may be based on the one or more synthesizing methods.

Also, in an embodiment, the one or more synthesizing methods may include at least one of a sol-gel method, a solid-state method, a wet-chemical method, a microwave-assisted method, an aerogel method, an acid-digestion method, a hydrothermal method, and a solvothermal method.

Figure 10:
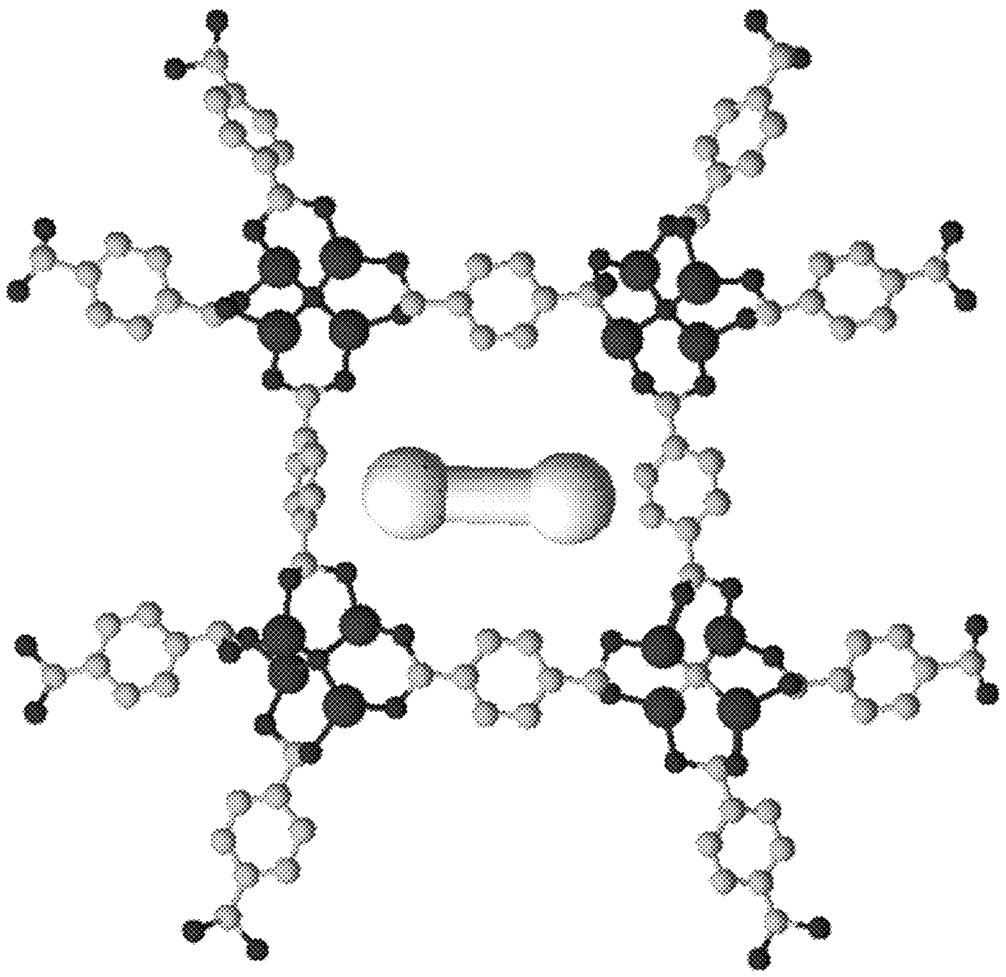
FIG. 10 illustrates a particle of a material for facilitating generating of electrical energy betavoltaically according to an embodiment.

FIG. 10 illustrates a particle of a material for facilitating generating of electrical energy betavoltaically according to an embodiment.

Figure 11:
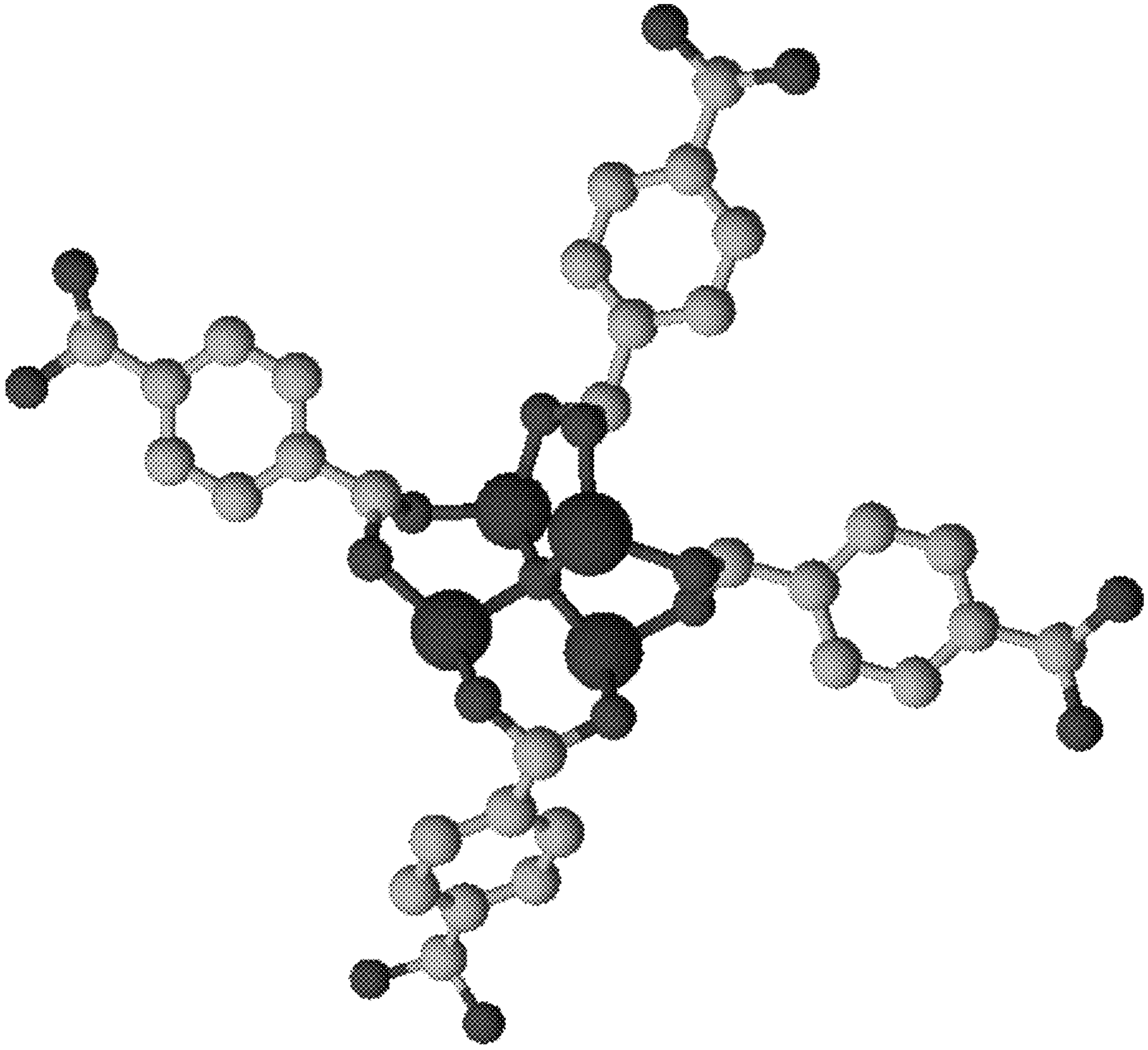
FIG. 11 is a Ball-and-Stick structural representation of an MOF-5 particle according to an embodiment.

Referring to FIG. 11, an exemplary Ball-and-Stick structural representation of the MOF-5 is shown, with Hydrogen (H) atoms being omitted for clarity. Here, the exemplary MOF-5 has a Zinc (Zn) inner core including four Zn atoms linked together with an Oxygen (O) at the center amongst the Zn. The Zn inner core is also encircled by additional O atoms (two per Zn atom), each of which is then linked to hydrocarbon/organic carboxylate (e.g., 1, 4 benzenedicarboxylate) including Carbon (C) and additional O atoms.

The formula for synthesizing the MOF-5 may written follows:

Formula 1

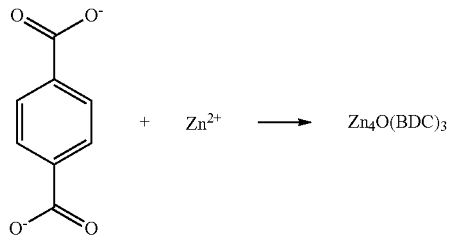

BDC where BDC=1,4 benzenedicarboxylate.

The three-dimensional structure of the MOF-5 forms pores or voids in which tritium may be stored. Here, the tritium is not chemically bonded to another atom within the MOF-5, rather it is stored through chemical adsorption, a process resulting from a chemical chemical bond between the tritium and an active site of the MOF-5, in this case the pores within the MOF-5.

The advantage of using MOF-5 for storing tritium is that MOF-5 has a high hydrogen uptake. In particular, the MOF-5 has a strong affinity to hold the tritium within its pores, and allows for a large amount of tritium to be stored within a given volume of space. This is unlike other MOFs, which are selective towards other gases and/or compounds.

Figure 12:
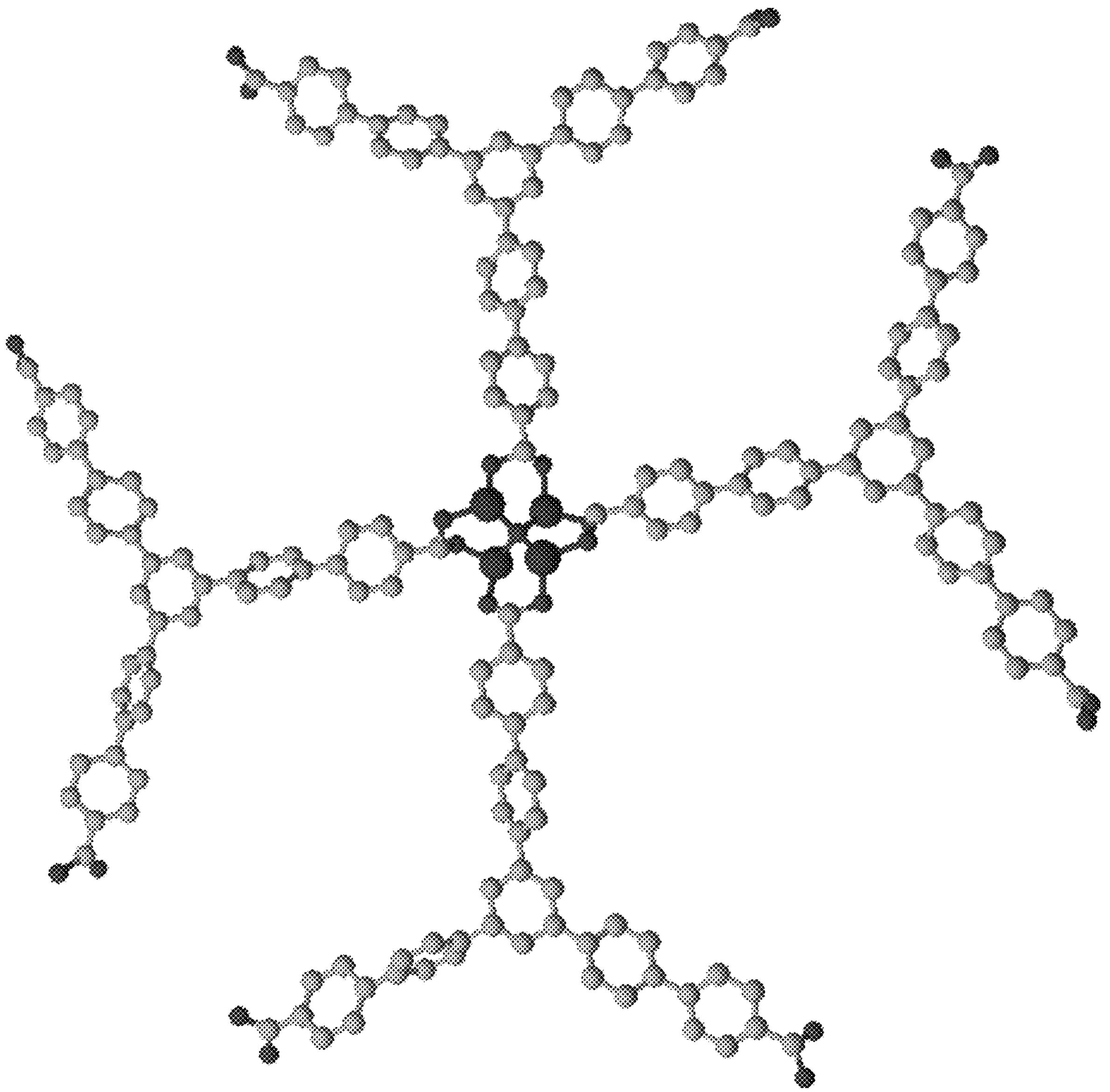
FIG. 12 is a Ball-and-Stick structural representation of an MOF-200 particle according to an embodiment.

Referring to FIG. 12, an exemplary Ball-and-Stick structural representation of the MOF-200 is shown, with Hydrogen (H) atoms being omitted for clarity. Here, the MOF has the same Zinc (Zn) inner core including four Zn atoms linked together with an Oxygen (O) at the center amongst the Zn. The Zn inner core is also encircled by additional O atoms (two per Zn atom), each of which is then linked to the four hydrocarbon/organic carboxylate groups (e.g., 4,4'4"-(Benzene-1,3,5-triyl-tris (benezene-4, 1-diyl)) tribenzoic acid including Carbon (C) and additional O atoms.

The formula for synthesizing the MOF-200 may written follows:

Formula 2

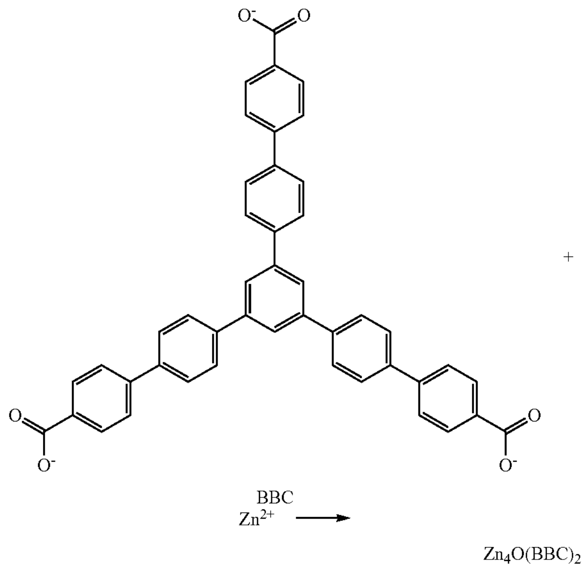

where BBC=4,4',4"-(Benzene-1,3,5-triyl-tris (benzene-4, 1-diyl)) tribenzoic acid.

Even more than the MOF-5, the MOF-200 has an even higher hydrogen uptake than the MOF-5 at room temperature. In particular, the MOF-200 has a stronger affinity than the MOF-5 to hold the tritium within its pores, and also allows for a larger amount of tritium to be stored within an increased volume of space, when compared to other MOFs, which are selective towards other gases and/or compounds.

Additionally, when a light metal such as Li+ is used within the MOF-200, gravimetric can greatly increase. For example, hydrogen uptake can almost double by using Li+ when compared to a traditional transition metal core within the MOF structure.

The physical properties of the above-described exemplary MOFs are shown in the table below:

| Compound Identification | Molecular Weight (g/mol) | Chemical Formula | Surface Area ($m^2/g$) | Gravimetric Capacity (wt %) |
|---|---|---|---|---|
| MOF-5 | 769.90 | $C_{24}H_{12}O_{13}Zn_4$ | 4000 (@298K) | 1.35 (@100 bar, 298K) |
| MOF-200 | 1677.00 | $C_{90}H_{62}O_{17}Zn_4$ | 4530 (@77K, 80 bar) | 3.24 (@100 bar, 298K) |

Within the tables, for respective MOF-5 and MOF-200, optimum tritium uptake may be achieved when the gravimetric capacity is maximized at the respective optimum temperature and pressure settings.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as “first,” “second,” and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase “at least one of” followed by a listing of items means that any of the listed items can be utilized individually, or any combination of two or more of the listed items can be utilized. For example, if a system is described as including “at least one of A, B, and C,” the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A system for producing a material for facilitating generating of electrical energy betavoltaically, the system comprising:

a reaction vessel configured for receiving an amount of a Metal Organic Framework (MOF) material in the reaction vessel, wherein the MOF material comprises a plurality of MOF particles of one or more MOF;

a temperature controller coupled with the reaction vessel, wherein the temperature controller is configured for modifying a value of a temperature associated with the MOF material to one or more required values of the temperature after the receiving;

a manifold coupled with the reaction vessel, wherein the manifold comprises an inlet channel and an outlet channel, wherein a first end of the inlet channel is fluidly coupled with the reaction vessel using a first vessel valve, wherein a first end of the outlet channel is fluidly coupled with the reaction vessel using a second vessel valve;

a first tank fluidly coupled with a second end of the inlet channel, wherein the first tank comprises a tritium gas, wherein the first tank is configured for supplying the tritium gas through the inlet channel to the reaction vessel for at least one duration based on a transitioning a first tank valve of the first tank to an open state, a transitioning the first vessel valve to an open state, and a transitioning of the second vessel valve to a closed state; and a pressure controller coupled with the inlet channel of the manifold, wherein the pressure controller is configured for modifying a value of a pressure associated with the reaction vessel to one or more required values of the pressure for allowing absorption of at least one amount of the tritium gas into the amount of the MOF material for the producing of the material, wherein the material is a MOF-tritium material, wherein the MOF-tritium material comprises at least one molecule of tritium stored in at least one pore formed by the plurality of MOF particles.

2. The system of claim 1 further comprising a vacuum pump fluidly coupled with a second end of the outlet channel, wherein the vacuum pump is configured for applying a vacuum to the manifold based on a transitioning of the first vessel valve to the open state and a transitioning of the second vessel valve to an open state after the receiving of the (Metal Organic Framework (MOF) material, wherein the applying of the vacuum removes a solvent residue of the MOF material from the manifold after the receiving of the MOF material, wherein the supplying of the tritium gas is further based on the applying of the vacuum.

3. The system of claim 1 further comprising a mass flow controller coupled with the inlet channel, wherein the mass flow controller is configured for modifying a value of a mass flow rate of the tritium gas to one or more required values of the mass flow rate after the supplying of the tritium gas, wherein the absorption of the at least one amount of the tritium gas into the amount of the (Metal Organic Framework (MOF) material is based on the modifying of the value of the mass flow rate of the tritium gas to the one or more required values of the mass flow rate, wherein the modifying of the value of the mass flow rate modifies the value of the pressure.

4. The system of claim 1 further comprising a second tank fluidly coupled with the outlet channel, wherein the second tank is configured for collecting at least one residue amount of the tritium gas from the reaction vessel and the manifold for evacuating the manifold and the reaction vessel based on a transitioning of a second tank valve of the second tank to an open state, a transitioning of the first tank valve to the closed state, and a transitioning of the second vessel valve to the open state after the supplying of the tritium gas.

5. The system of claim 4, wherein the pressure controller further comprises a pressure sensor configured for detecting a value of the pressure associated with the reaction vessel, wherein the system further comprises a third tank fluidly coupled with the inlet channel, wherein the third tank comprises an inert gas, wherein the third tank is configured for supplying the inert gas through the inlet channel to the reaction vessel for at least one duration based on a transitioning a third tank valve of the third tank to an open state, a transitioning of the first vessel valve to the open state, a transitioning of the second vessel valve to the open state, and a transitioning of the second tank valve to a closed state after the detecting an atmospheric pressure value for the pressure.

6. The system of claim 5, wherein the manifold comprises a secondary outlet channel, wherein a first end of the secondary outlet channel is fluidly coupled to the outlet channel using a channel valve, wherein the inert gas is evacuated from a second end of the secondary outlet channel for flushing the manifold and the reaction vessel based on a transitioning of the channel valve to an open state, wherein the flushing removes at least one residue amount of the tritium gas from the manifold and the reaction vessel, wherein the Metal Organic Framework (MOF)-tritium material is retrievable from the reaction vessel after the flushing.

7. A method of making a radioisotopic power source, comprising:

receiving a predetermined amount of a plurality of Metal-Organic Framework (MOF) particles within a reactor vessel;

degassing the received predetermined amount of the MOF, wherein degassing includes:

placing the predetermined amount of the MOF under vacuum conditions, heating the received predetermined amount of the MOF above a first predetermined temperature for a first predetermined time period, and sealing the heated MOF;

cooling the heated and sealed predetermined amount of the MOF to a second predetermined temperature, while maintaining a pressure of the reactor vessel to a first predetermined pressure value for a second predetermined time period;

receiving a predetermined amount of a plurality of beta emitter particles at a gaseous state and mixing the predetermined amount of beta emitter particles with the cooled predetermined amount of the MOF within the reactor vessel so that a weight ratio between the received predetermined amount of a plurality of beta emitter particles and the predetermined amount of the plurality of MOF particles is 1:1 is maintained;

modifying the pressure of the reactor vessel to a second predetermined pressure; and evacuating the reactor vessel and flushing the vessel with an inert gas to remove residual gaseous beta emitter particles.

8. The method of claim 7, wherein the first predetermined temperature is about 200 C.

9. The method of claim 7, wherein the first predetermined time period is about two to eight hours.

10. The method of claim 7, wherein the second predetermined temperature is about −196 C.

11. The method of claim 7, wherein the first predetermined pressure value is between about 12000 torr to about 75000 torr, and the second predetermined pressure value is about atmospheric pressure.

12. The method of claim 7, wherein the second predetermined time period is about one hour, and the inert gas includes argon.

* * * * *